United States Patent [19]
Kishel

[11] 3,787,683
[45] Jan. 22, 1974

[54] RADIATION GAUGE FOR MEASURING FLUID DENSITIES

[75] Inventor: Joseph F. Kishel, Clarks Summit, Pa.

[73] Assignee: Weston Instruments, Inc., Newark, N.J.

[22] Filed: May 24, 1972

[21] Appl. No.: 256,315

[52] U.S. Cl............................................. 250/43.5 D
[51] Int. Cl. .......................................... G01n 23/12
[58] Field of Search................. 250/43.5 D, 83.3 FT

[56] References Cited
UNITED STATES PATENTS
3,529,151   9/1970   Carr-Brion...................... 250/43.5 D

*Primary Examiner*—James W. Lawrence
*Assistant Examiner*—Davis L. Willis
*Attorney, Agent, or Firm*—William R. Sherman; Jerry M. Presson; Marvin J. Spivak

[57] ABSTRACT

A radiation gauge for measuring fluid densities is disclosed, which is particularly useful in monitoring the density of multiple regime fluids flowing through conduits. The gauge includes a radiation source which projects a radiation beam to a detector through a length of conduit or pipe containing a continuous stream of the fluid under investigation. The conduit or pipe includes a relatively gentle curve in the measuring area in order to minimize the disruption of the flow of fluid within the conduit, and in order to minimize the amount of steel or conduit wall material which must be penetrated by the radiation beam. The path length traversed by the radiation beam is selected to maximize both the magnitude and the signal-to-noise ratio of the output information signal, and to maximize the resolution of the gauge.

9 Claims, 4 Drawing Figures

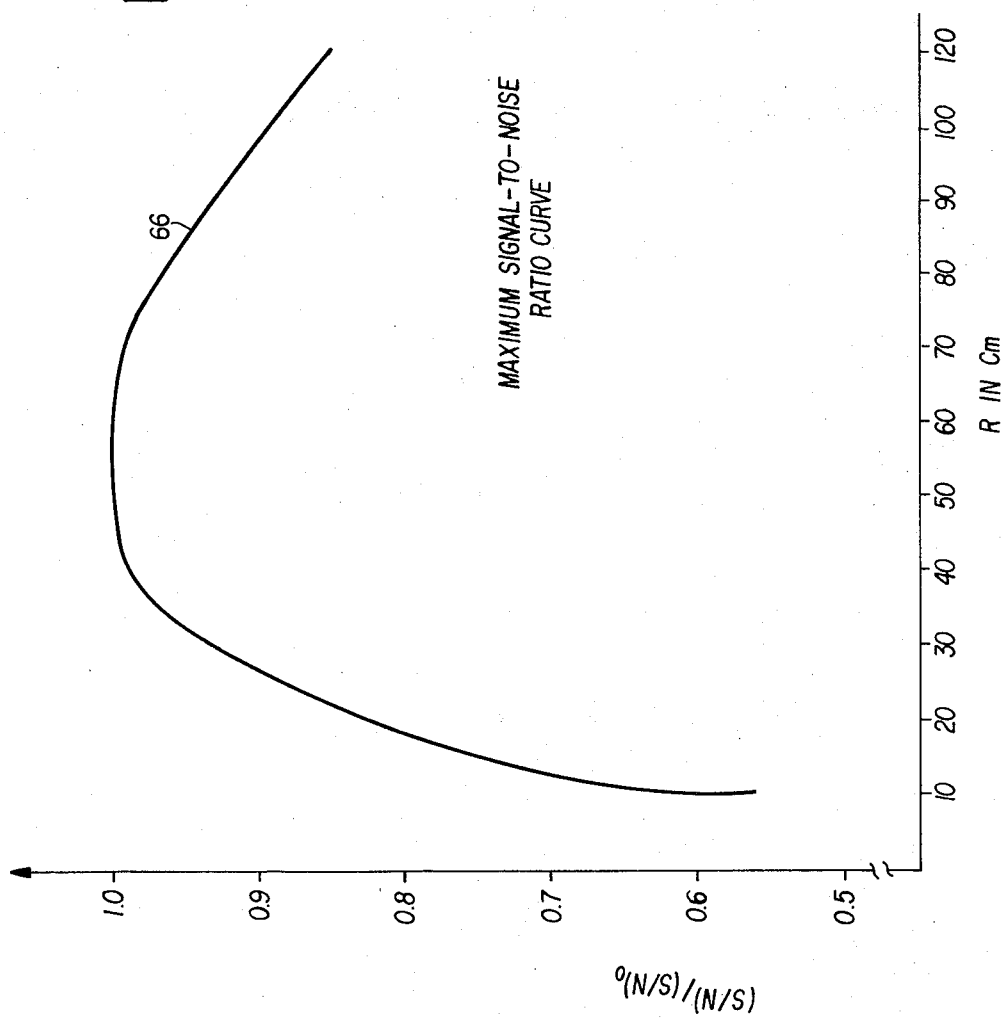

RADIATION GAUGE FOR MEASURING FLUID DENSITIES

BACKGROUND OF THE INVENTION

1. Field of the Invention

This invention relates generally to a radiation density gauge, and more particularly to a radiation gauge for measuring fluid densities.

2. Description Of The Prior Art

Many situations exist in which the measurement of fluid densities is very important. More particularly, in many cases it is extremely important to monitor the density of a fluid continuously flowing through a conduit or pipeline. A particularly critical example of this type of situation occurs in the crude petroleum industry. For example, a large number of oil wells are often located in the same general area, and high pressure water or steam is continuously pumped into the wells to drive out the useful hydrocarbons or crude petroleum located deep beneath the earth. However, when a large quantity of water is pumped into a number of wells in the same area, one or more of the wells may become completely flooded with water, with the result that the output of the flooded wells is primarily recirculated water, containing a very small quantity of useful hydrocarbon material. Since it is very expensive and wasteful to continue operation of such flooded and non-producing wells, it is highly desirable to determine when a well becomes flooded, or when the output of a well is particularly low in useful materials.

Generally, the output of a well of the type discussed above is in the form of a multiple regime fluid, such as a mist. Clearly, it is possible to determine what type of material is being produced by the well by monitoring the density of the mist being forced out of the well. It is generally desirable that the necessary density measurements be made in the form of a continuous analysis, since the well output is normally a continuously flowing fluid.

As is well known in the art, radiation density gauges can be used to monitor the density of fluids flowing through conduits or pipe lines. For example, U.S. Patents to Barieau, (U.S. Pat. No. 2,833,929) and Kloppel (U.S. Pat. No. 3,106,933) disclose density gauges in which a radiation beam is passed to a detector through a quantity of fluid flowing through a short vertical or horizontal section of pipeline. Similarly, a U.S. Pat. to Herzog, (U.S. Pat. NO. 2,534,352) discloses a type of density gauge in which a radiation beam is diagonally projected through a straight, vertical pipe segment containing a flowing fluid. Of these patents, Barieau discloses a system for analyzing the density of hydrogen-containing substances, while Kloppel discloses the measurement of multiple regime fluids, such as liquids carrying suspended solid particles.

However, the radiation gauges disclosed in these patents, which are typical of radiation gauges customarily used in the past, all include fundamental shortcomings which render them inaccurate or impractical for use under all but the most ideal conditions.

More particularly, the Barieau and Kloppel patents disclose radiation density gauges which include pipe segments oriented at right angles with respect to a main pipeline or conduit. A radiation beam is projected through the pipe segment, and the fluid contained therein, to obtain an indication or measurement of the density of the fluid flowing in the pipeline. However, in order for the density measurement to be accurate, the body of fluid through which the radiation beam is projected must be continuous and substantially homogeneous. In practice it has been found that radiation gauges which include sharp or right angle bends in a fluid pipeline, such as those disclosed in the Barieau and Kloppel patents, create severe turbulence and cavitation, causing fluids to change their physical state or to assume an inhomogeneous distribution as they pass through the sharp bends. For example, multiple regime fluids, such as mists, tend to condense into liquids at the right angle bends. Liquids containing dissolved gases tend to become bubble permeated, and solid particles carried in flowing liquids tend to form slugs. In addition, annular and cavitated flow patterns tend to develop at or near sharp bends. Clearly, all of these phenomena tend to destroy the accuracy of the density analysis being performed, since all of these phenomena negate the basic assumption of a homogeneous fluid flow. Accordingly, while radiation density gauges of the types described in the Barieau and Kloppel patents may produce accurate outputs under ideal circumstances, these types of gauges are highly unreliable in practice.

The type of gauge disclosed in the Herzog patent avoids the difficulties of turbulent flow, described above, by using a straight pipe segment. However, the use of a straight pipe segment in a radiation density gauge is disadvantageous in that it severely limits the sensitivity and resolution of the gauge. More particularly, a radiation beam which is simply projected perpendicularly through a pipe containing a fluid may not encounter a sufficient mass of the fluid to attenuate the radiation beam to a significant degree, thereby rendering any density measurement very inaccurate. This is particularly true where the fluid has a relatively low density, as in the case of a mist. To improve the accuracy of the measurement, and increase the fluid mass in the radiation beam path, the beam may be projected diagonally through a straight pipe segment, as is done in the Herzog patent. However, as the length of the diagonal is increased, the total thickness of the side wall material of the pipe segment which must be penetrated by the radiation beam increases very rapidly, resulting in severe attenuation of the measuring radiation beam. Thus, in the type of device disclosed in the Herzog patent, an increase in the fluid volume in the beam path can be achieved only at the expense of greatly increased attenuation of the beam itself. Accordingly, this type of system is inherently inaccurate and inefficient.

In addition to the shortcomings described above, the prior art has generally failed to consider the efficiency and sensitivity of the radiation gauge itself, and has failed to relate the dimensions of the gauge pipe segment to the sensitivity and resolution of the gauge as a whole.

SUMMARY OF THE INVENTION

Accordingly, one object of this invention is to provide a novel radiation density gauge structure for monitoring the density of fluid flowing through a conduit.

Yet another object of the present invention is to provide a novel radiation fluid density gauge which minimizes the interference with the flow of fluid in a conduit.

A further object of this invention is to provide a novel gauge for monitoring the density of fluid flowing through a conduit which achieves a more accurate and reliable measurement than was known in the past.

Still another object of the present invention is to provide a novel radiation density gauge which is particularly suitable for monitoring the density of multiple regime fluids.

A still further object of this invention is to provide a novel radiation density gauge of improved sensitivity and efficiency.

Briefly, these and other objects of the invention are achieved in accordance with the apparatus of the instant invention by providing a radiation density gauge formed of a pipe segment which deviates in a gentle curve from the general orientation of a pipeline. Thus, fluid entering the gauge pipe segment is smoothly diverted by only an acute angle from is normal direction of flow, and is again smoothly diverted by only an acute angle in returning to its normal direction of flow. A radiation source is provided to project a radiation beam through the gauge pipe segment to a detector which senses the intensity of the emerging beam. The gauge pipe segment is configured so that the path of the radiation beam through the gauge maximizes the signal-to-noise ratio and resolution of the gauge.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a graph illustrating a maximum signal-to-noise ratio curve; and

DESCRIPTION OF THE PREFERRED EMBODIMENT

Figure 1:
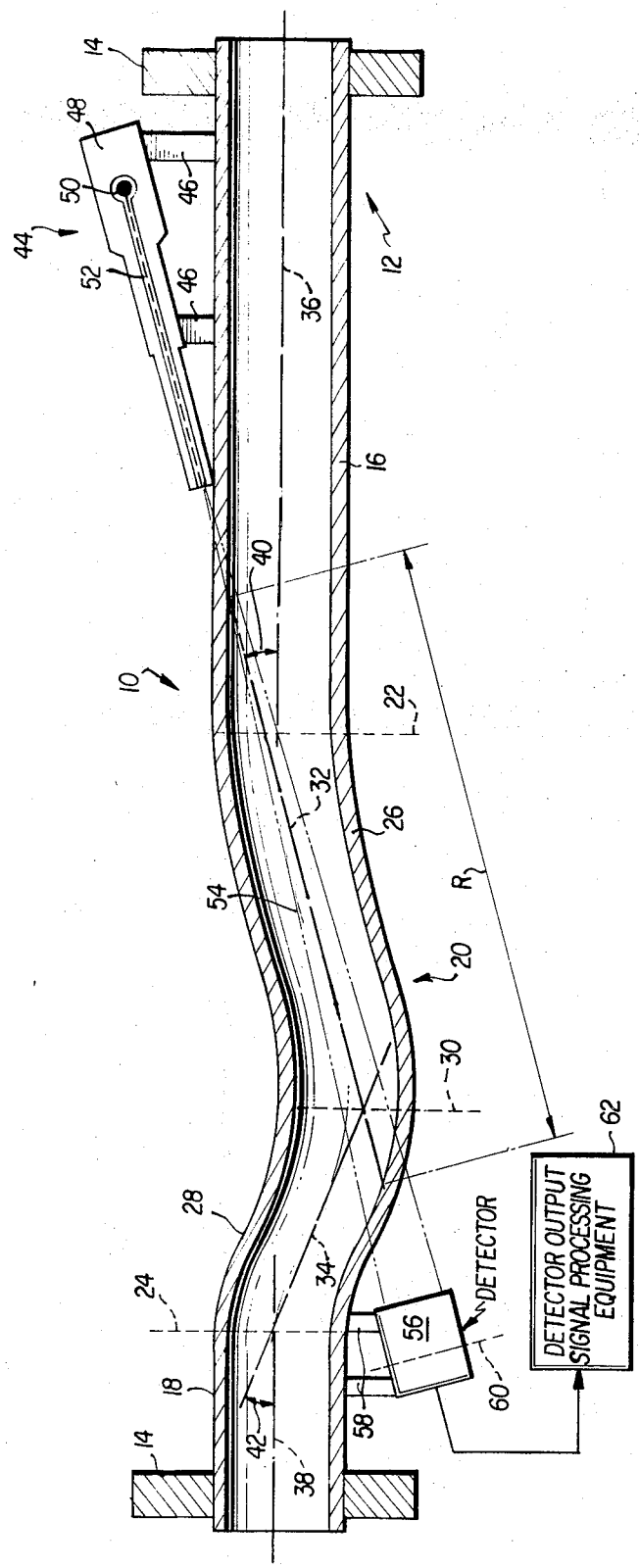
FIG. 1 is a sectional and block diagramic view of the radiation density gauge of the present invention.

Referring now to the drawing, and more particularly to FIG. 1 thereof, a preferred embodiment of the radiation density gauge of the present invention is illustrated, referenced generally by the numeral 10. The gauge 10 includes a pipe section 12 having mounting flanges 14 secured to both ends thereof. The mounting flanges permit the gauge 10 to be coupled into, and made a part of, any type of conventional steel pipe, having a diameter of approximately 3 inches. However, pipes made from other materials may equally well be used, and the diameter of the pipe section 12 may vary over a wide range, so that the gauge of the present invention may be coupled into pipelines of varying diameters without substantially impeding the flow in the pipeline. Thus, the diameter of the pipe section 12 may be selected over a wide range depending upon the diameter of the pipeline into which the gauge 10 is to be coupled.

The pipe section 12 includes a first substantially straight portion at one end thereof, and a second substantially straight portion 18 at the other end thereof. The straight portions 16 and 18 may have equal or unequal lengths. The precise length of either of the straight portions is not critical, since these portions of the pipe section 12 primarily function to couple the gauge 10 with a suitable pipeline. A curved portion 20 of the pipe section 12 joins the first and second straight portions 16 and 18. The curved portion 20 extends from approximately a first dashed line 22 to a second dashed line 24, illustrated in FIG. 1. The curved portion 20 of the pipe section 12 is preferably formed integral with the straight portions 16 and 18. Thus, in manufacturing the gauge 10, a straight length of pipe is first preferably selected, and is then bent or formed using conventional pipe forming techniques into the configuration illustrated in FIG. 1. Forming the gauge 12 from a single, continuous pipe section is advantageous in that it eliminates the need for joints within the body of the gauge itself. This helps to insure a smooth flow through the gauge 10, and further reduces the likelihood of turbulence in the flow of fluid through the gauge. In addition, conventional pipe forming techniques permit the formation of extremely smooth curves, without any projections or sharp angles to interfere with the flow of fluid.

As stated herein above, the accuracy of a gauge which analyses the density of a continuously flowing fluid is dependent upon the basic assumption that the fluid flow is homogeneous. In order to insure that the fluid flow through the gauge 10 is as nearly homogeneous as possible, it has been determined that the extent to which the curved portion 20 of the pipe segment 12 deviates from the general orientation of the straight portions 16 and 18 of the pipe segment 12 should be confined to a relatively narrow range. More particularly, the curved portion 20 is divided into a downwardly sloping segment 26 and an upwardly sloping segment 28. The downwardly sloping segment 26 extends from approximately the first dashed line 22 to a third dashed line 30. Similarly, the upwardly sloping portion 28 extends from approximately the second dashed line 24 to the third dashed line 30. It will be understood that the terms "downwardly sloping" and "upwardly sloping" are used only for the purposes of describing the embodiment of the invention illustrated in FIG. 1, and the segments referred to need not actually slope either upwardly or downwardly. The axis of the downwardly sloping segment 26 is illustrated by a line 32. Similarly, the axis of the upwardly sloping segment 28 is illustrated by a line 34, while the axes of the straight portions 16 and 18 are illustrated by lines 36 and 38, respectively. As shown in FIG. 1, the axis 32 of the downwardly sloping segment 26 forms an angle 40 with the axis 36 of the straight portion 16. It has been found that the gauge 10 performs best if the angle 40 is selected to be 15°, although the gauge performs very well provided that the angle 40 is within a range of from approximately 10° to approximately 30°. Similarly, an angle 42 is formed between the axis 34 of the upwardly sloping segment 28 and the axis 38 of the straight portion 18. The angle 42 is selected to be within the range of from 10° to 30°, as is the angle 40. Although the angle 42 may be chosen to equal to the angle 40, it may also differ from the angle 40, as illustrated in FIG. 1. More specifically FIG. 1 illustrates the angle 40 as being approximately 15°, and the angle 42 as being approximately 20°.

A source of gamma radiation 44 is rigidly coupled to the pipe section 12 by means of a suitable mechanical mounting assembly 46. The gamma source 44 includes a housing 48, which is preferably constructed of lead or another suitable radiation shielding material. A body of radio-active material 50 is positioned within the housing 48 to provide a radiation beam. Although various types of radioactive material can be used with the system of the present invention, Cesium 137, which has an energy output of 0.66 Mev. is the material preferably used with the present invention. It has been found that best results are attained if the body of radioactive material 50 provides a relatively large radioactive source, such as a 1 curie source for example. A collimating aperture 52 is formed in one side of the housing 48 in order to confine the radioactive energy emitted by the body 50 to a relatively narrow beam.

The gamma source 44 is oriented such that the collimating aperture 52 is approximately aligned with the axis 32 of the downwardly sloping pipe segment 26. Thus, a radiation beam 54 is projected from the gamma source along the axis of the downwardly sloping segment 26 and toward a radiation detector 56. The radiation detector 56, which may be a conventional ionization chamber, is mounted to the pipe segment 12 by means of a suitable mechanical mounting assembly 58. The radiation detector 56 is oriented such that its longitudinal axis, illustrated by a dashed line 60, is perpendicular to the path of the radiation beam 54 in order to maximize the radiation flux passing through the radiation detector 56. The output signal from the radiation detector 56 is fed to suitable signal processing equipment 62. The signal processing equipment 62 may, for example, include circuits for converting a current output from the radiation detector into a signal representing the density of the material flowing through the gauge 10, and may also include a type of alarm or feedback network for generating a control signal in response to the detection of various levels in the output signal from the radiation detector 56.

It has been found that the need for substantial amounts of radiation shielding around the gauge 10 can be reduced by appropriate construction of the gauge itself. For example, it a 1 curie source of radioactive material is used, and the collimating aperture 52 provides at least 4 inches of collimation, a relatively narrow but intense radiation beam can be projected through the pipe section 12 without producing high levels of spurious radiation in the vicinity of the gauge. For example, using the above described source and collimation parameters, the radiation levels in the vicinity of the gauge 10 were found to be less than 5 milliroentgens per hour at a distance of 1 foot from the gauge, except at the point where the radiation beam emerged from the pipe section 12, where a radiation level of approximately 20 milli-roentgens per hour was observed.

In utilizing the gauge of the present invention, virtually any type of fluid may be passed through the gauge 10 in either direction. The fluid may be either a single or a multiple regime fluid of virtually any density, and may flow through the pipe section 12 at either a high or a low rate of flow. The radiation beam 54 is then projected through a quantity of the fluid flowing through the gauge 10 which is contained in a portion of the gauge designated R. The length R represents the total interior length of the gauge 10 which is traversed by the radiation beam 54. It has been discovered that an appropriate choice of the length R is significant in maximizing the output signal and the signal-to-noise ratio of the gauge 10, thereby maximizing the resolution of sensitivity of the gauge. In general, as the length R is increased, the output of the radiation detector 56 will first begin to increase, and will subsequently decrease due to reduced radiation flux passing through the detector. Similarly, the signal-to-noise ratio of the system (where noise is defined as the statistical fluctuation in the radioactive source output) will be a maximum for a particular length R. These dependencies of the gauge of the present invention on the length R will now be analyzed in more detail.

Consider first the maximum signal condition of the detector 56 as a function of the distance R. In general, the radiation flux due to a point source ($\Gamma$) is described by the following equation:

$$\Gamma = E/4 \pi D^2 \tag{1}$$

where $E$ is the disintegration rate of the source, and $D$ is the distance from the source.

Let $I_s$ be defined as the intensity of the radioactive source, and let $\Omega$ be an effective solid angle, then, $$\Omega = A/(K + R)^2 \tag{2}$$

where $A$ is the cross sectional area of the radiation detector 36, and $K$ is the sum of the distances of the radioactive body 50 and the detector 56 from the exterior surfaces of the pipe section 12, plus the total thickness of pipe segment walls penetrated by the radiation beam. Thus, $$\Omega = A/D^2 \tag{3}$$

The intensity at the detector without any absorbing material (fluid) between the source and the detector is:

$$I_o = I_s \Omega/4 \pi \tag{4}$$

Thus, $$I_o = I_s A/4 \pi D^2 \tag{5}$$

When an empty container or pipe segment is positioned between the source and the detector, the intensity at the detector is:

$$I_1 = I_o e^{-(\mu/\rho)_w 2t \rho w} \tag{6}$$

where $(\mu/\rho)_w$ and $\rho w$ are the mass attenuation coefficient and the density of the container walls respectively. When the container is filled with a medium of density $\rho$, the intensity at the detector reduces to:

$$I\rho = I_1 e^{-(\mu/\rho) R\rho} \tag{7}$$

where $\mu/\rho$ and $\rho$ are the mass attenuation coefficient and density of the medium. If the output signal of the system is defined as $S$, then:

$$S = \Delta I\rho \tag{8}$$
$$S = I\rho (\mu/\rho)\Delta\rho R \tag{9}$$

or $$dS/d\rho = (\mu/\rho)RI\rho \tag{10}$$

The output signal is thus a function of $(\mu/\rho)$, $\Delta\rho$ and $R$, i.e.:

$$S = f(\Delta\rho,(\mu/92), R) \text{ and} \tag{11}$$
$$dS = \delta f/\delta(\Delta\rho) \ d(\Delta\rho) + [\delta f/\delta(\mu/\rho)] \ d(\mu/\rho) + (\delta f/\delta R)dR \tag{12}$$

When the fractional change in the density of the absorbing material and the quality of the source are kept constant, $\delta f/\delta(\mu\rho)$ and $\delta f/\delta(\mu/\rho)$ vanish, and:

$$dS/dR = \delta f/\delta R = (\delta/\delta R) I (\mu/\rho)R\Delta\rho \tag{13}$$

or $$\frac{dS}{dR} = \frac{d}{dR}\left\{\left(\frac{\mu}{\rho}\right)\Delta\rho R \frac{I_s A}{4\pi(K+R)^2} e^{-\left(\frac{\mu}{\rho}\right)_w^{2t\rho w}} e^{-\left(\frac{\mu}{\rho}\right)^{R\rho}}\right\} \quad (14)$$

$$= \frac{I_s A}{4\pi}\left(\frac{\mu}{\rho}\right)\Delta\rho e^{-\left(\frac{\mu}{\rho}\right)_w^{2t\rho w}} \frac{e^{-\left(\frac{\mu}{\rho}\right)^{\rho R}}\left(-R\rho\left(\frac{\mu}{\rho}\right)+1-\frac{2R}{K+R}\right)}{(K+R)^2} \quad (15)$$

The maximum occurs where $dS/dR = 0$ and this is true only when $$-R\rho(\mu/\rho) + 1 - (2R/K + R) = 0 \quad (16)$$

That is:

$$R_{os} = \frac{1}{2}\left\{-\left[\frac{1}{\left(\frac{\mu}{\rho}\right)\rho} + K\right] + \sqrt{\left[\frac{1}{\left(\frac{\mu}{\rho}\right)\rho} + K\right]^2 + \frac{4K}{\left(\frac{\mu}{\rho}\right)\rho}}\right\} \quad (17)$$

$R_{os}$, then, is the optimum pipe length for maximum signal as a function of $K, (\mu/\rho)$ and $\rho$.

Consideration is now directed to determining the length $R$ at which the signal-to-noise ratio is maximized. Again, the signal $S$ is given by equation 9, and the noise is considered to be the statistical fluctuations in the source, so that the signal-to-noise ratio is given by:

$$Y = \frac{\Delta I \rho}{\sqrt{I\rho}} = \left(\frac{\mu}{\rho}\right)\Delta\rho R \sqrt{\frac{I_s A}{4\pi}} e^{-\left(\frac{\mu}{\rho}\right)_w^{\rho wt}} \frac{e^{-\left(\frac{\mu}{\rho}\right)\rho R/2}}{(K+R)} \quad (18)$$

$$\frac{dY}{dR} = e^{-\left(\frac{\mu}{\rho}\right)_w^{t\rho w}} \sqrt{\frac{I_s A}{4\pi}}\left(\frac{\mu}{\rho}\right)\Delta\rho \frac{e^{-\left(\frac{\mu}{\rho}\right)\rho R/2}}{K+R}$$

$$\left[\frac{-R\left(\frac{\mu}{\rho}\right)\rho}{2} + 1 - \frac{R}{K+R}\right] \quad (19)$$

At $dY/dR = 0$, $Y$ will be a maximum and this can occur only when:

$$R^2 (\mu/\rho) \rho + RK (\mu/\rho) \rho - 2K = 0 \quad (20)$$

or $$R_{ov} = -K/2 + \sqrt{K^2/4 = [2K/(\mu/\rho)\rho]} \quad (21)$$

Thus $R_{ov}$ is the pipe length corresponding to the optimum value of the signal-to-noise ratio.

Figure 2:
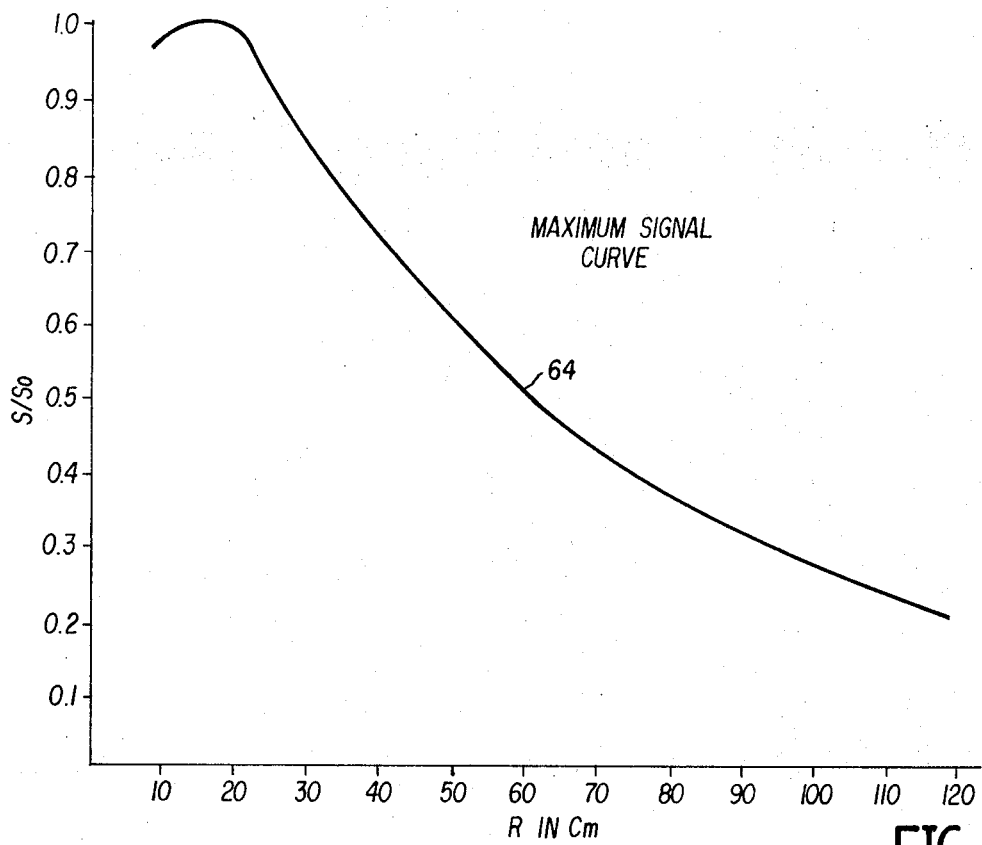
FIG. 2 is a graph illustrating a maximum signal curve.

The relationships derived above are illustrated more clearly in graphical form in FIGS. 2 and 3. In these graphical illustrations it is assumed that the radioactive body 50 and the radiation detector 56 are positioned approximately 8 cm from the top and bottom surfaces, respectively, of the pipe section 12, and that the total thickness of the pipe walls penetrated by the radiation beam 54 is approximately 1.6 cm. It is further assumed that a Cesium 137 source of 0.66 Mev is used, and that the density of the material flowing through the gauge is approximately 0.1 gm/cc.

Referring particularly to FIG. 2, a curve 62 is illustrated which shows the relationship between the ratio of a given output signal of the detector 56 to its maximum output signal (vertical axis) versus the length $R$ (horizontal axis). The curve 62 has a maximum at approximately $R=20$ cm. Thus, the maximum output signal from he system illustrated in FIG. 1 would be derived if $R$ were equal to approximately 20 cm.

FIG. 3 illustrates a curve 66 which shows the relationship between the ratio of a particular signal-to-noise ratio at the detector 56 to the maximum signal-to-noise ratio (vertical axis), versus $R$ (horizontal axis). The curve 66 illustrates that the signal-to-noise ratio at the detector 56 is near its maximum provided the length $R$ is between approximately 40 cm. and approximately 75 cm.

Figure 4:
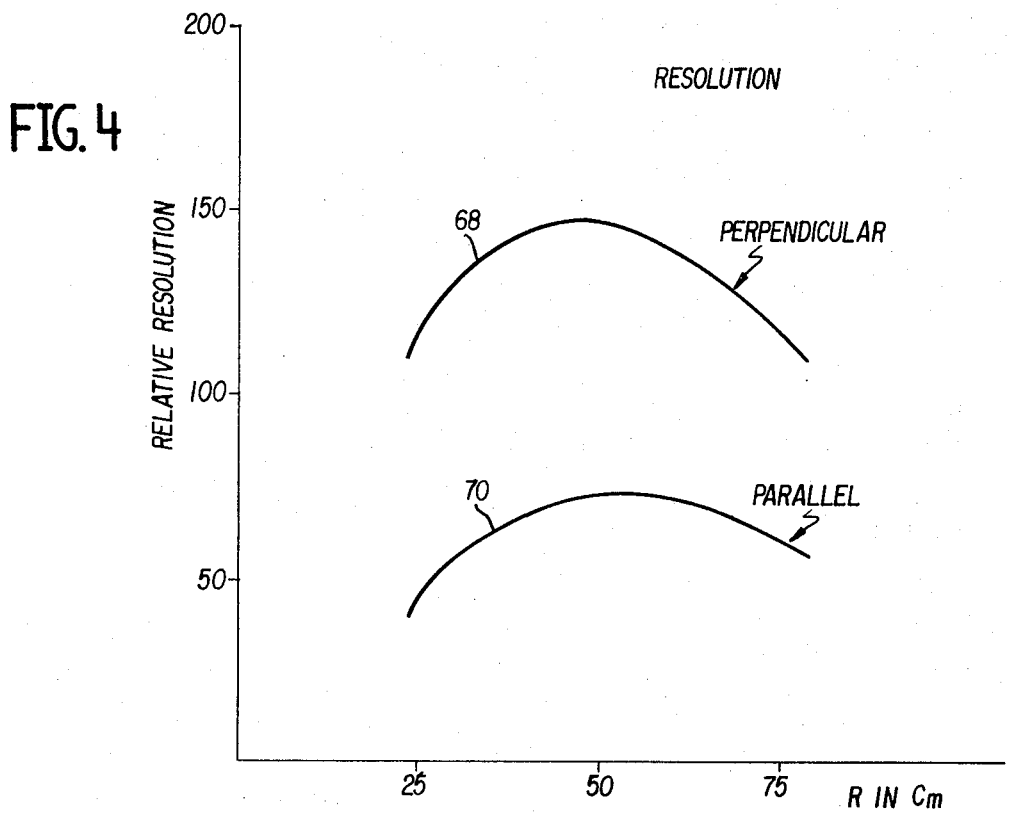
FIG. 4 is a graph illustrating density gauge resolution as a function of the radiation beam path length.

FIG. 4 illustrates a pair of curves 68 and 70 which represent the resolution of the radiation gauge 10 of the present invention in terms of relative units of resolution (vertical axis) versus the length $R$ (horizontal axis). The curve 88 indicates the resolution when the longitudinal axis 60 of the radiation detector 56 is oriented perpendicular to the radiation beam 54, and the curve 70 represents the resolution when the longitudinal axis 60 of the radiation detector 56 is oriented parallel to the radiation beam 54. As shown by FIG. 4, the resolution of the gauge 10 is greater if the longitudinal axis 60 of the detector 56 is perpendicular to the radiation beam 54, since a greater area of the detector 56 is then exposed to the radiation beam.

The resolution curves 68 and 70 illustrate a combination of the effects illustrated in FIGS. 2 and 3. As can be seen from FIG. 4, the resolution of the gauge 10 of the present invention is maximized if the length $R$ is selected as approximately 46 cm. The curve 68 also clearly illustrates that a length $R$ less than 20 cm. or greater than 100 cm. substantially reduces the resolution of the gauge. Accordingly, it is clear from FIG. 4 that the efficiency and accuracy of the radiation gauge of the present invention is dependent upon careful selection of the length $R$. It will of course be understood that the optimum length $R$ varies in accordance with the density of the material being measured and the various other parameters in the equations derived above. Thus, the present invention includes the realization that proper selection of the length $R$ is significant to optimizing the performance of the radiation gauge 10.

Obviously, numerous modifications and variations of the present invention are possible in light of the above teachings. It is therefore to be understood that within the scope of the appended claims, the invention may be practiced otherwise than as specifically described herein.

Accordingly, what is claimed as new and desired to be secured by letters patent of the united states is:

1. A radiation gauge for measuring the density of a fluid in a conduit comprising:
   first conduit means having a first axis for providing a first fluid coupling to said gauge,
   second conduit means having a second axis for providing a second fluid coupling to said gauge, said second conduit means spaced from said first conduit means,
   third conduit means for coupling said first and second conduit means, said third conduit means including at least a first segment having an axis which forms an acute angle with said first axis, said third conduit means joined to said first and second conduit means to form a smooth curve in said conduit, said smooth curve shaped to prevent changes in the physical characteristics of said fluid as it traverses said gauge,
   radiation source means for projecting a single radiation beam through said third conduit means, said radiation source means oriented to project said radiation beam parallel to said axis of said first segment; and,
   radiation detector means for sensing said radiation beam as it emerges from said third conduit means.

2. A radiation gauge for measuring the density of a fluid, as in claim 1, wherein:
   said third conduit means is configured such that said radiation beam traverses a predetermined length of said third conduit means; and,
   said predetermined length is selected to maximize the resolution of said gauge.

3. A radiation gauge for measuring the density of a fluid, as in claim 2, wherein:
   said predetermined length is between substantially 20 and 100 centimeters.

4. A radiation gauge for measuring the density of a fluid, as in claim 2, wherein:
   said predetermined length is approximately 46 centimeters.

5. A radiation gauge for measuring the density of a fluid, as in claim 1, wherein:
   said acute angle lies substantially within the range of from 10° to 30°.

6. A radiation gauge for measuring the density of a fluid, as in claim 1, wherein:
   said acute angle is approximately 15°.

7. A radiation gauge for measuring the density of a fluid, as in claim 1, wherein:
   said third conduit means further comprises a second segment,
   said second segment having an axis which forms an acute angle with said second axis, said acute angle chosen to prevent changes in the physical characteristics of said fluid as it traverses said gauge.

8. A radiation gauge for measuring the density of a fluid, as in claim 7, wherein:
   said acute angle formed by said axis of said first segment with said first axis is approximately equal to said acute angle formed by said axis of said second segment with said second axis.

9. A radiation gauge for measuring the density of a fluid, as in claim 1, wherein:
   said first, second and third conduit means are formed of a single, continuous length of pipe.

* * * * *